United States Patent
Funahashi (10) Patent No.: US 11,808,380 B2
(45) Date of Patent: Nov. 7, 2023

(54) VALVE DEVICE

(71) Applicant: DENSO CORPORATION, Kariya (JP)

(72) Inventor: Rie Funahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/714,353

(22) Filed: Apr. 6, 2022

(65) Prior Publication Data

US 2022/0325806 A1   Oct. 13, 2022

(30) Foreign Application Priority Data

Apr. 8, 2021  (JP) ................. 2021-065631

(51) Int. Cl.
*F16K 5/12*     (2006.01)
*F16K 27/06*   (2006.01)
*F16K 5/04*     (2006.01)
*F16K 11/087*  (2006.01)

(52) U.S. Cl.
CPC .............. *F16K 5/12* (2013.01); *F16K 5/0407* (2013.01); *F16K 27/065* (2013.01); *F16K 11/0876* (2013.01); *Y10T 137/86871* (2015.04)

(58) Field of Classification Search
CPC ...... F16K 5/0407; F16K 5/201; F16K 27/067; F16K 11/076; F16K 31/04; F16K 31/055; F16K 5/10; F16K 5/12; F16K 11/087–0876; F16K 39/045; F16K 39/06; F16K 11/0856; F16K 11/0873; F01P 7/14; F01P 7/16; F01P 2007/146; Y10T 137/86871; Y10T 137/86541; Y10T 137/86533; Y10T 137/86928; Y10T 137/86919; Y10T 137/86751; Y10T 137/86936; Y10T 137/87748; G01M 3/202; G01M 3/205; G05D 7/0635–0647
USPC ...... 137/625.12–625.16, 628–630.22, 627.5, 137/625.47, 625.32, 867, 876
See application file for complete search history.

(56) References Cited

U.S. PATENT DOCUMENTS

| | | | | |
|---|---|---|---|---|
| 1,589,178 A | * | 6/1926 | Kenyon | F16K 11/083 137/625.16 |
| 2,632,469 A | * | 3/1953 | Lamar | F16K 5/0214 137/601.19 |
| 3,459,228 A | * | 8/1969 | Mongodin | F16K 11/0873 137/628 |
| 5,009,393 A | * | 4/1991 | Massey | F16K 15/12 251/207 |
| 5,524,863 A | * | 6/1996 | Davis | B08B 9/00 251/127 |

(Continued)

*Primary Examiner* — Craig J Price
(74) *Attorney, Agent, or Firm* — Nixon & Vanderhye P.C.

(57) ABSTRACT

A valve device includes: a housing having a communication passage forming a part of a path from an inlet to an outlet; and a valve body disposed to be rotatable about a valve axis in the housing. The valve body has a peripheral wall portion facing a communication passage port at one end of the communication passage, and adjusts an opening area of the communication passage port according to its rotation position. The peripheral wall portion has a closure portion capable of fully closing the communication passage port, and openings arranged apart from each other in the circumferential direction. The plurality of openings include a large opening and one or more small openings smaller than the large opening. The centers of the small openings are axially offset.

7 Claims, 5 Drawing Sheets

(56) References Cited

U.S. PATENT DOCUMENTS

| | | | | |
|---|---|---|---|---|
| RE35,866 E | * | 8/1998 | Simmons | B05B 17/08 |
| | | | | 137/625.11 |
| 5,983,937 A | * | 11/1999 | Makihara | F24D 19/1015 |
| | | | | 251/207 |
| 6,490,740 B1 | * | 12/2002 | Gardenier | A61H 33/601 |
| | | | | 4/601 |
| 7,168,397 B2 | * | 1/2007 | Chanfreau | B60H 1/00485 |
| | | | | 123/41.01 |
| 7,275,606 B1 | * | 10/2007 | Sims | F16K 47/045 |
| | | | | 175/218 |
| 7,650,869 B2 | * | 1/2010 | Slemp | F01L 7/16 |
| | | | | 123/190.17 |
| 8,235,709 B2 | * | 8/2012 | Meagher | F23D 14/22 |
| | | | | 431/18 |
| 9,670,825 B2 | * | 6/2017 | Murakami | F01P 3/20 |
| 10,280,829 B2 | * | 5/2019 | Shen | F16K 31/043 |
| 10,359,121 B2 | * | 7/2019 | Ozeki | F01P 7/165 |
| 10,514,103 B2 | * | 12/2019 | Yumisashi | F16K 27/067 |
| 10,626,999 B2 | * | 4/2020 | Ozeki | F16K 11/0856 |
| 10,808,856 B2 | * | 10/2020 | Shen | F01P 3/20 |
| 10,927,972 B2 | * | 2/2021 | Murakami | F16K 31/002 |
| 10,975,975 B2 | * | 4/2021 | Sato | F16K 27/04 |
| 11,054,047 B2 | * | 7/2021 | Querejeta Andueza | |
| | | | | F16K 31/041 |
| 11,079,027 B2 | * | 8/2021 | Ozeki | F16K 5/0464 |
| 11,261,799 B2 | * | 3/2022 | Pollock | F04D 27/023 |
| 11,378,189 B2 | * | 7/2022 | Shen | F16K 31/535 |
| 2021/0381422 A1 | * | 12/2021 | Osmun | F16K 11/0873 |

* cited by examiner

FIG. 11 (Comparative Example)

VALVE DEVICE

CROSS REFERENCE TO RELATED APPLICATION

The present application is based on and claims the benefit of priority of Japanese Patent Application No. 2021-065631, filed on Apr. 8, 2021, the disclosure of which is incorporated herein by reference.

TECHNICAL FIELD

The present disclosure generally relates to a valve device.

BACKGROUND INFORMATION

A comparative flow rate control valve includes a valve body that can rotate around a predetermined axis. A side wall of the valve body has, formed thereon: relatively small first and second openings; and a third opening that is larger than the small openings and large enough to open an inlet pipe and a bypass pipe almost fully. The flow rate control valve adjusts the flow rate of a fluid according to an opening area of a communication passage through the opening of the valve body.

SUMMARY

It is an object of the present disclosure to provide a valve device having a small valve body.

BRIEF DESCRIPTION OF THE DRAWING

Objects, features, and advantages of the present disclosure will become more apparent from the following detailed description made with reference to the accompanying drawings, in which.

DETAILED DESCRIPTION

Hereinafter, embodiments will be described with reference to the drawings. In the embodiments, substantially identical structural and functional parts are designated with identical reference numerals thereby to simplify the description.

First Embodiment

Figure 1:
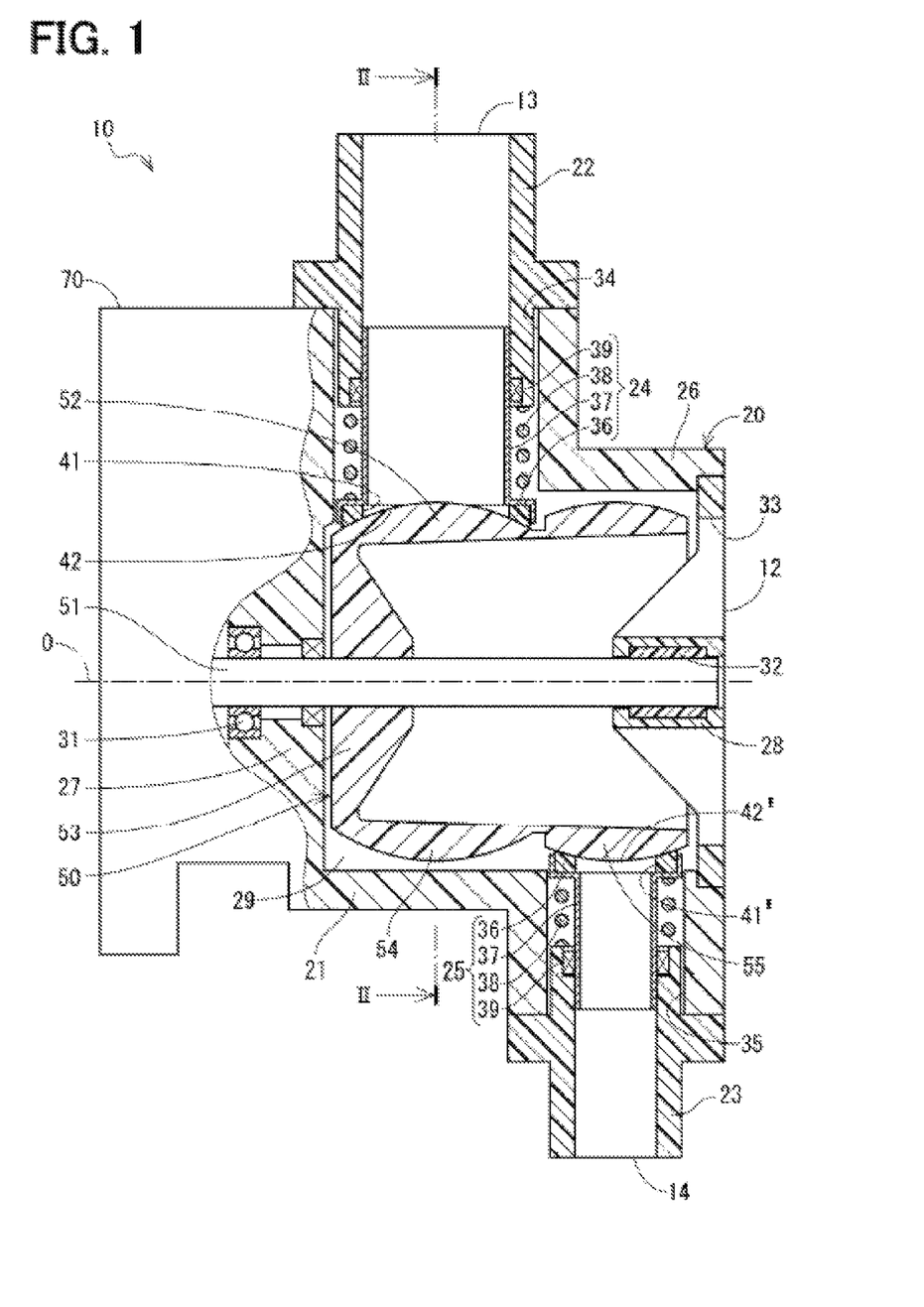
FIG. 1 is a cross-sectional view showing a schematic configuration of a valve device according to an embodiment.

The valve device of one embodiment is provided in the middle of a cooling water circulation path in a cooling system to control a flow rate and path of the cooling water. As shown in FIG. 1, a valve device 10 includes a housing 20 having an inlet 12 and outlets 13 and 14, a valve body 50 rotatably provided about a predetermined axis O (also known as a valve axis) in the housing 20, and an actuator 70 for rotatably driving the valve body 50.

Here, a direction parallel to the axis O is defined as the axial direction. Further, a direction orthogonal to the axis O is defined as the radial direction. Further, a direction around the axis O is defined as the circumferential direction.

The housing 20 includes a main body 21, pipes 22, 23 and seal units 24, 25. The main body 21 has a tubular portion 26 and support portions 27 and 28 arranged at both ends of the tubular portion 26. The support portions 27 and 28 are arranged on the axis O. The support portion 27 is provided with a bearing 31, and the support portion 28 is provided with a bearing 32. The support portion 28 has an inlet hole 33 that penetrates the main body 21 in and out. One end of the inlet hole 33 is the inlet 12. The tubular portion 26 has a pipe installation hole 34 provided near the support portion 27 and a pipe installation hole 35 provided near the support portion 28. The pipe 22 is provided in the pipe installation hole 34, and the pipe 23 is provided in the pipe installation hole 35. An outer opening of the pipe 22 is the outlet 13, and an outer opening of the pipe 23 is the outlet 14.

Figure 2:
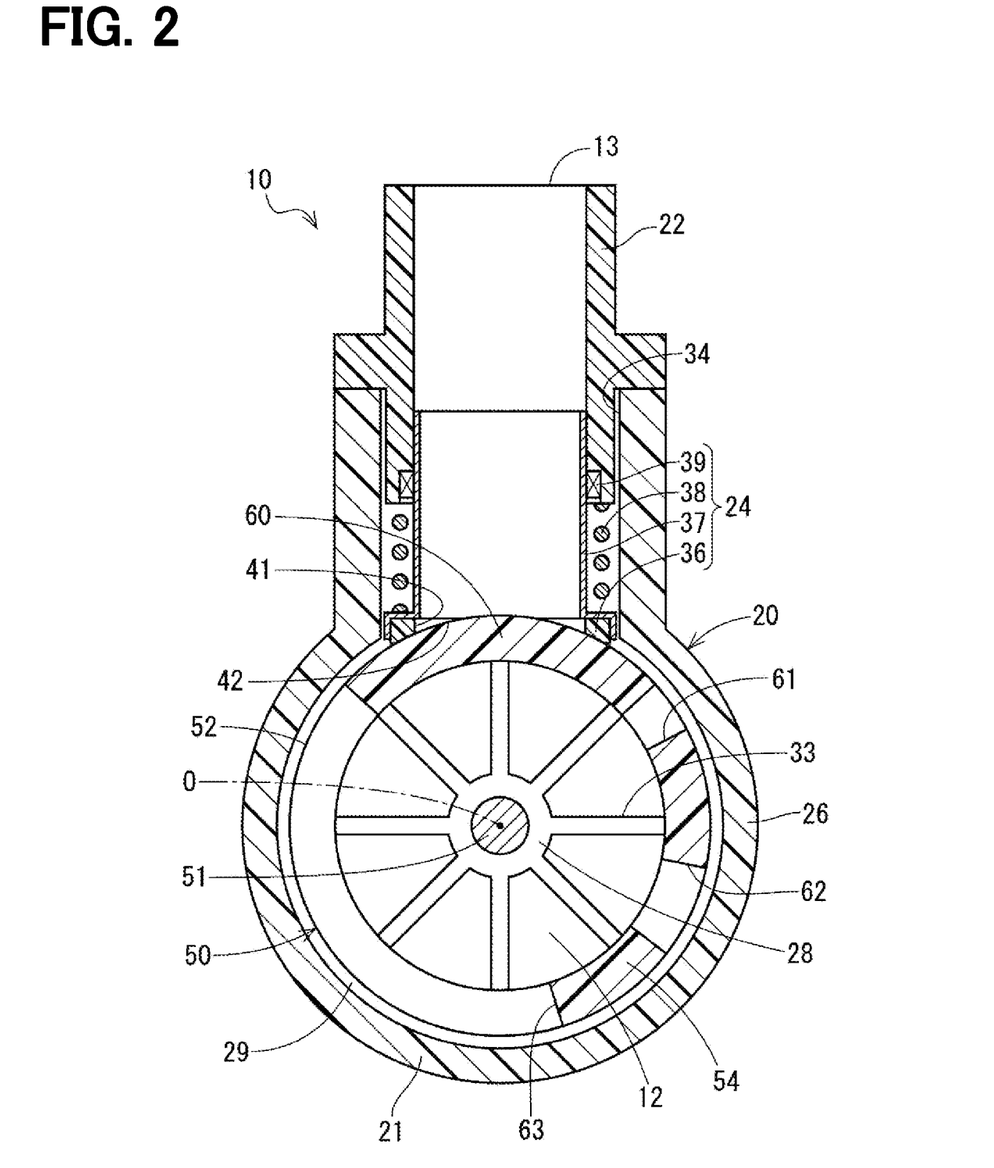
FIG. 2 is a cross-sectional view taken along a line II-II of FIG. 1.

As shown in FIGS. 1 and 2, the valve body 50 has a rotating shaft portion 51, a peripheral wall portion 52, and a connecting portion 53. The rotating shaft portion 51 is supported by the bearings 31 and 32. The actuator 70 is connected to one end of the rotating shaft portion 51. The connecting portion 53 connects the rotating shaft portion 51 and the peripheral wall portion 52. The peripheral wall portion 52 has a cylindrical shape and has annular portions 54 and 55 connected so as to be aligned in the axial direction. The outer peripheral surfaces of the annular portions 54 and 55 are approximately spherical to help seating. The seal unit 24 is provided at a position between the annular portion 54 and the pipe 22, and the seal unit 25 is provided at a position between the annular portion 55 and the pipe 23.

The seal unit 24 and the annular portion 54 have the same configuration as the seal unit 25 and the annular portion 55. Hereinafter, the seal unit 24 and the annular portion 54 will be described on behalf of them.

The seal unit 24 has a seat 36, a sleeve 37, a spring 38 and a packing 39. The sheet 36 is an annular seal member that abuts on the outer peripheral surface of the annular portion 54. The sleeve 37 is a tubular member provided to protrude from the inside of the pipe 22 into a valve body accommodating space 29, and holds the seat 36. The spring 38 presses the seat 36 against the annular portion 54 via the sleeve 37. The packing 39 is provided between the pipe 22 and the sleeve 37. When the valve body 50 rotates, the annular portion 54 slides with respect to the seat 36, so that the seal state by the seal unit 24 is maintained.

Figure 3:
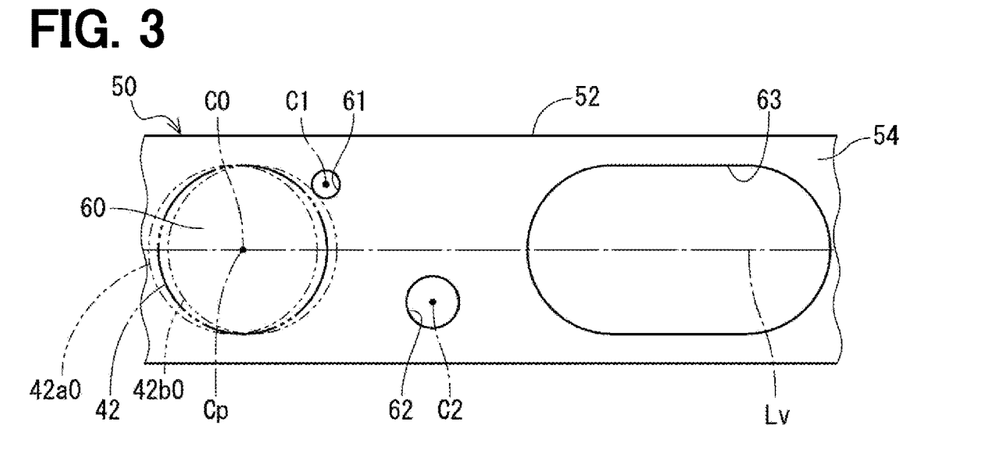
FIG. 3 is a development view of an outer peripheral surface of an annular portion of a valve body shown in FIG. 2, showing a fully closed state in which a communication passage port and a closure portion coincide with each other.

The seat 36 has a communication passage 41 at the center thereof. The communication passage 41 communicates with the exit 13 and constitutes a part of the path from the inlet 12 to the exit 13, and the communication passage 41' communicates with the exit 14 and constitutes a part of the path from the inlet 12 to the exit 14. An opening at one end of the communication passage 41 is a communication passage port 42 facing the peripheral wall portion 52, and an opening at one end of the communication passage 41' is a communication passage port 42' facing the peripheral wall portion 52. As shown in FIG. 3, the communication passage port 42 seen from the radial direction is circular, and has a shape such that the size in the circumferential direction becomes smaller as the distance from a center Cp of the communication passage port 42 increases in the axial direction increases.

As shown in FIGS. 1 to 3, the valve body 50 adjusts the opening area of the communication passage port 42 according to the rotation position. Specifically, the annular portion 54 adjusts the opening area of the communication passage port 42 by using the closure portion 60 that can completely close the communication passage port 42 and a plurality of openings 61, 62, 63. The plurality of openings 61, 62, 63 are arranged apart from each other in the circumferential direction. The plurality of openings 61, 62, 63 include a large opening 63 capable of opening the communication passage port 42 substantially fully, and two small openings 61, 62 smaller than the large opening 63. The small opening 61 is smaller than the small opening 62. The small opening 61 is arranged closer to the closure portion 60 at a position between the closure portion 60 and the large opening 63. The small opening 62 is arranged closer to the large opening 63 at a position between the closure portion 60 and the large opening 63.

Figure 4:
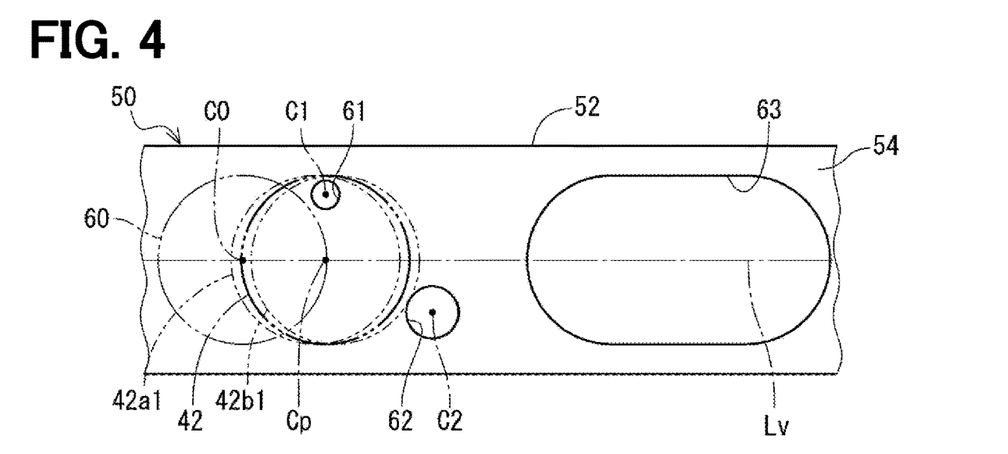
FIG. 4 is a development view similar to FIG. 3, showing a first small opening state in which the communication passage port and a first small opening communicate with each other.
Figure 5:
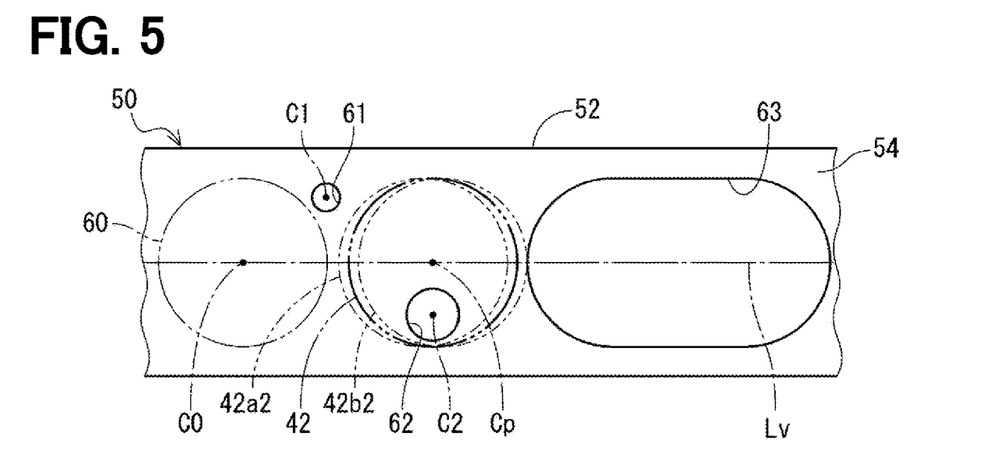
FIG. 5 is a development view similar to FIG. 3, showing a second small opening state in which the communication passage port and a second small opening communicate with each other.
Figure 6:
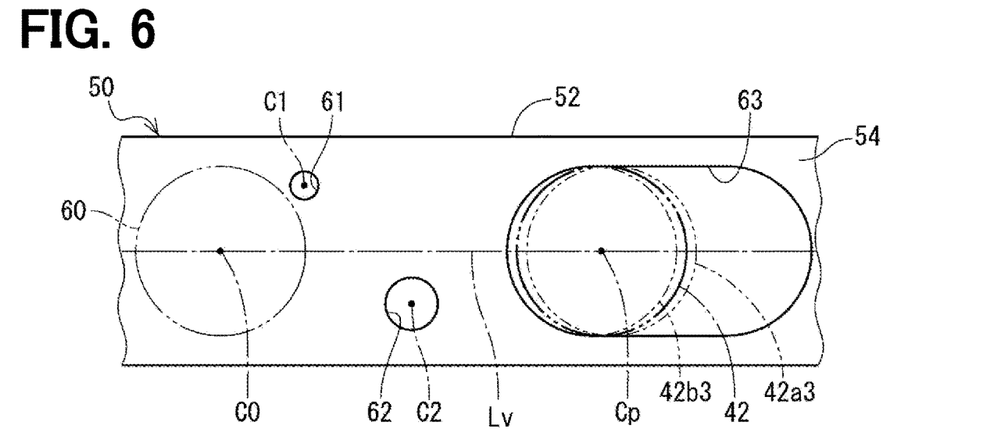
FIG. 6 is a development view similar to FIG. 3, showing a fully open state in which the communication passage port and a large opening communicate with each other.

As shown in FIGS. 4 to 6, the openings 61, 62, and 63 are arranged so that the communication passage port 42 can be opened independently. Such arrangement enables control of the flow rate of the cooling water to be substantially constant. Specifically, as shown in FIG. 4, when the circumferential position of a center C1 of the small opening 61 coincides with the circumferential position of the center Cp of the communication passage port 42, only the small opening 61 communicates with the communication passage port 42. As described above, the other openings 62 and 63 are arranged apart from the small opening 61. As shown in FIGS. 5 and 6, the same applies to the positioning of the other openings 62 and 63.

Further, as shown in FIG. 3, the openings 61, 62, and 63 are arranged so as not to communicate with the communication passage 41 even if the valve body 50 is stopped at a position slightly deviated from a fully closed position. In such manner, the fully closed state of the communication passage port 42 can be maintained even if the accuracy of the stop position of the valve body 50 is lowered. Specifically, as shown in FIG. 3, the openings 61, 62, 63 are arranged apart from the closure portion 60 so as not to communicate with communication passage ports 42$a$0, 42$b$0 even when having a relative movement in one and the other circumferential directions by a predetermined distance with respect to a center C0 of the closure portion 60. Hereinafter, a relative movement area of the communication passage port 42 in the circumferential direction, which is allowed to maintain the fully closed state, is defined as a first allowable movement area A0, and also as a closure-keeping movement area A0 in some claims (see FIG. 7).

Further, the openings 61, 62, 63 are arranged to realize a state in which the openings 61, 62, 63 independently (i.e., by itself) open the communication passage port 42 even if the valve body 50 is stopped at a position slightly deviated from a predetermined position (hereinafter, a single opening state). In such manner, even if the accuracy of the stop position of the valve body 50 is lowered, the opening area of the communication passage port 42 does not change, and the flow rate of the cooling water can be kept constant. Specifically, as shown in FIG. 4, only the small opening 61 is configured to communicate completely with respect to communication passage ports 42$a$1 and 42$b$1 that have moved by a predetermined distance in one and the other circumferential direction with respect to the center C1 of the small opening 61, by the arrangement of the other openings 62, 63 apart from the small opening 61. As shown in FIGS. 5 and 6, the same applies to the positioning of the other openings 62 and 63. Hereinafter, second allowable movement areas A1, A2, and A3 are defined respectively as the relative movement areas of the communication passage port 42 in the circumferential direction, which are allowed for maintaining the single opening state by the openings 61, 62, 63. (See FIG. 7). Note that second allowable movement areas A1, A2, and A3 may be referred to as first movable area in a certain claim.

Next, the features and advantages of the embodiment will be clarified by comparing the embodiment with a comparative example. Hereinafter, a virtual line extending in the circumferential direction through the center Cp (also known as a passage center) of the communication passage port 42 (also known simply as a port) is defined as a circumferential virtual line Lv.

Figure 11:
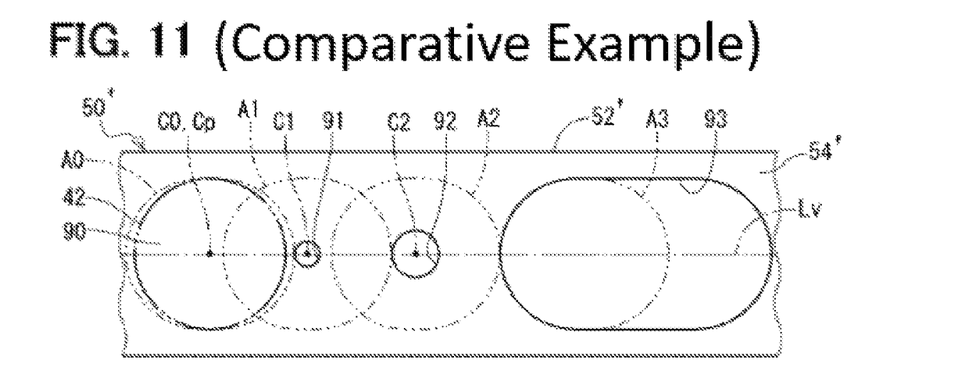
FIG. 11 is a development view of an outer peripheral surface of an annular portion in a valve device of a comparative example.

As shown in FIG. 11, in the comparative example, a closure portion 90 and a plurality of openings 91, 92, 93 arranged in an annual portion 54' of a valve body 50' have the same size as the closure portion 60 and the plurality of openings 61, 62, 63 of the one embodiment. The small openings 91 and 92 are arranged at the same axial positions as the communication passage port 42, just like the closure portion 90 and the large opening 93. That is, the centers C1 and C2 of the small openings 91 and 92 are located on the circumferential virtual line Lv. In such a comparative example, when considering "the circumferential length of the peripheral wall portion 52' is shortened as much as possible while maintaining the fully closed state and the single opening state even if the stop position deviates by a predetermined distance," it may be appropriate/preferable that (i) the small opening portion 91 is arranged so as to be adjacent to the first allowable movement area A0, (ii) the small opening 92 is arranged so as to be adjacent to the second allowable movement area A1, and (iii) the large opening 93 is arranged so as to be adjacent to the second allowable movement area A2. However, the circumferential length of the peripheral wall portion 52' cannot be shortened any further.

Figure 7:
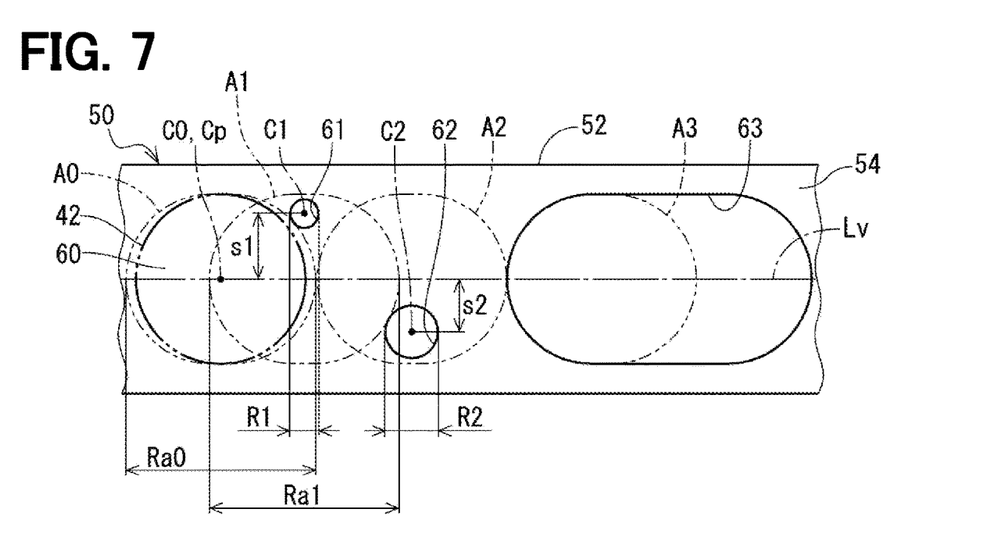
FIG. 7 is a diagram corresponding to FIG. 3 and shows a allowable movement area.

In the one embodiment, as shown in FIG. 7, the small openings 61 and 62 are arranged so that their centers C1 and C2 are axially displaced with respect to the center Cp of the communication passage port 42. That is, the centers 01 and C2 of the small openings 61 and 62 are axially deviated (in opposite or alternating directions) from the circumferential virtual line Lv.

Similar to the communication passage port 42, the allowable movement areas A0 and A1 are shaped so that the size in the circumferential direction becomes smaller as the distance from the circumferential virtual line Lv increases in the axial direction. Therefore, when considering "the circumferential length of the peripheral wall portion 52 is shortened as much as possible while maintaining the fully closed state and the single opening state even if the stop position deviates by a predetermined distance," the small openings 61, 62 can be arranged/brought closer toward the closure portion 60 as compared with the comparative example. In such manner, a circumferential range R1 of the small opening 61 overlaps with a part of a circumferential range Ra0 of the first allowable movement area A0 of the closure portion 60. Further, a circumferential range R2 of the small opening 62 overlaps with a part of the circumferential range Ra1 of the second allowable movement area A1 of the small opening 61. In the one embodiment, as compared with the comparative example, the small openings 61 and 62 are brought closer toward the closure portion 60, that is, the circumferential range R1 overlaps the circumferential range Ra0 and the circumferential range R2 overlaps the circumferential range Ra1. By a distance of move of the small openings 61 and 62 described above, the circumferential length of the peripheral wall portion 52 is shortened.

Further, the small openings 61 and 62 are sequentially arranged in the circumferential direction, and are also alternatively arranged on one side and on the other side in the axial direction with respect to the circumferential virtual line Lv. The amount of deviation 51 of the center C1 from the circumferential virtual line Lv may be different from the amount of deviation s2 of the center C2 from the circumferential virtual line Lv. The small opening 61 is arranged at a position as far apart as possible from the circumferential virtual line Lv in an overlapping area between the communication passage port 42a1 and the communication passage port 42b1, and outside the allowable movement area A0 and the allowable movement area A2. The small opening 62 is arranged at a position as far apart as possible from the circumferential virtual line Lv in an overlapping area of the communication passage port 42a2 and the communication passage port 42b2, and outside the allowable movement area A1 and the allowable movement area A3.

Effects

As described above, in one embodiment, the communication passage port 42 seen from the radial direction has a shape in which the size in the circumferential direction becomes smaller as the distance from the center C0 of the communication passage port 42 in the axial direction increases. The centers C1 and C2 of the small openings 61 and 62 are axially deviated from the circumferential virtual line Lv. In such manner, the small openings 61 and 62 can be arranged closer to the closure portion 60 as compared with the conventional form in which the centers C1 and C2 are positioned on the circumferential virtual line Lv. Then, when the valve body 50 rotates, the circumferential distance required for the small openings 61 and 62 to pass through the communication passage port 42 becomes shorter. Therefore, the (gap) distance between the openings 61, 62, 63 in the circumferential direction required for the small openings 61, 62 to open the communication passage port 42 independently becomes smaller, and the circumferential length of the peripheral wall portion 52 of the valve body 50 can be shortened. Therefore, the outer diameter of the valve body 50 can be reduced to reduce the size of the valve device 10.

Further, by reducing the moving distance of the sliding portion of the valve body 50 with respect to the housing 20, the load on the actuator 70 can be reduced, and the wear of the sliding portion related to the sliding of the valve body 50 can be reduced.

Further, in the one embodiment, the small openings 61 and 62 are sequentially arranged in the circumferential direction, and are alternatively arranged on one side and the other side in the axial direction with respect to the circumferential virtual line Lv. In such manner, the small openings 61 and 62 can be separated from each other as much as possible, and a decrease in the strength of the peripheral wall portion 52 can be prevented. The relative movement area in the circumferential direction of the communication passage port, which is allowed to maintain the fully closed state of the communication passage port, is defined as the first allowable movement area (A0).

Further, in the one embodiment, at least a part of the circumferential range R1 of the small opening 61 overlaps with the circumferential range Ra0 of the first allowable movement area. Therefore, the circumferential length of the peripheral wall portion 52 is shortened by the amount that the circumferential range R1 overlaps with the circumferential range Ra0.

Further, in the one embodiment, of the two small openings 61 and 62 adjacent to each other in the circumferential direction, the circumferential range R2 of the second small opening 62 overlaps with the circumferential range Ra1 of the first allowable movement area A1 of the first small opening 61. Therefore, the circumferential length of the peripheral wall portion 52 is shortened by the amount that the circumferential range R2 overlaps with the circumferential range Ra1.

Other Embodiments

In other embodiments, the amount of deviation from the circumferential virtual line at the center of each of small openings may be the same.

Figure 8:
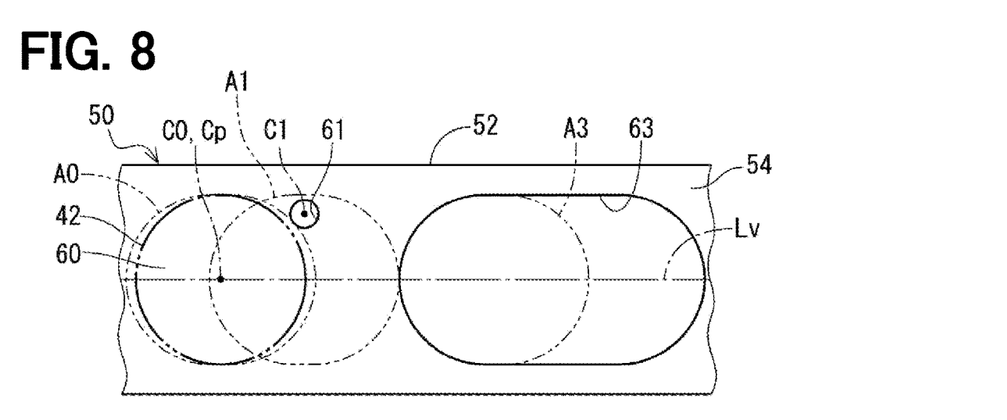
FIG. 8 is a development view of the outer peripheral surface of the annular portion in the valve device of a first other embodiment.
Figure 9:
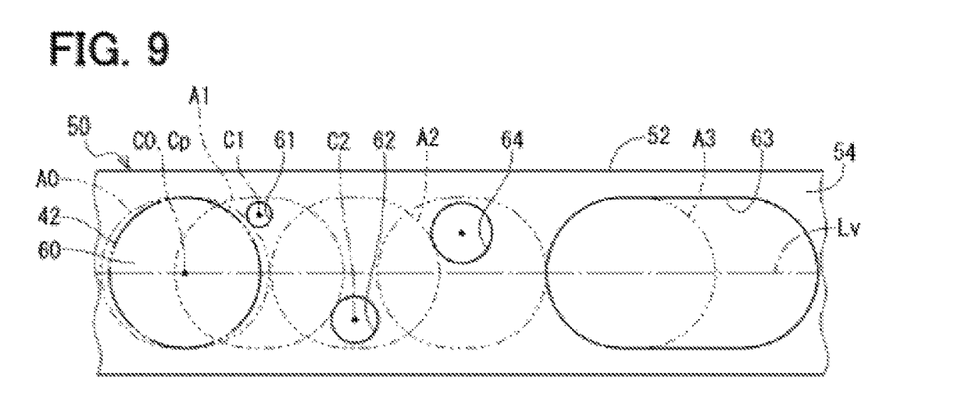
FIG. 9 is a development view of the outer peripheral surface of the annular portion in the valve device of a second other embodiment.
Figure 10:
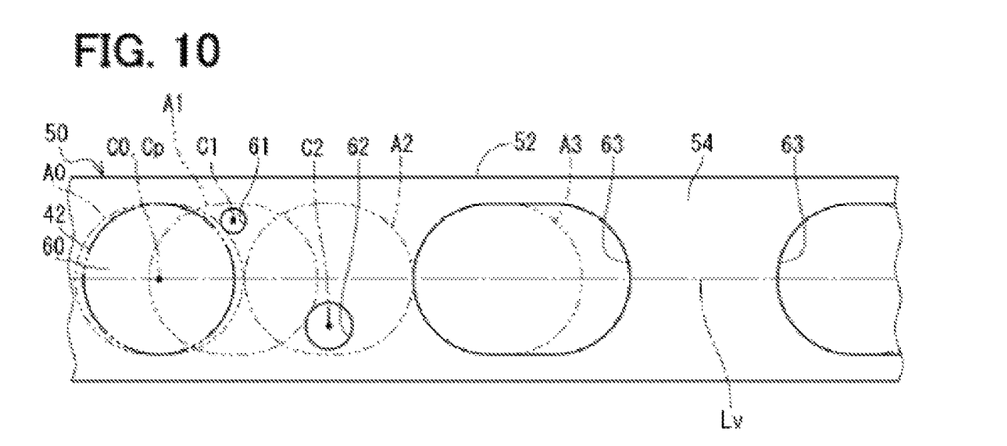
FIG. 10 is a development view of the outer peripheral surface of the annular portion in the valve device of a third other embodiment.

In other embodiments, there may be one small opening as shown in FIG. 8. Further, in other embodiments, as shown in FIG. 9, there may be three small openings (that is, small openings 61, 62, 64), or four or more small openings may be provided. Further, as shown in FIG. 10, a plurality of large openings 63 may be provided.

In other embodiments, two or more pipes may be provided corresponding to one annular portion. That is, one annular portion may be configured to open and close two or more outlets (or inlets). Further, the arrangement of the outlet and the inlet of the housing may be reversed. Further, the housing may have one outlet or may have a plurality of inlets.

In other embodiments, the valve device is not limited to the cooling system and may be used in other systems. The control target of the valve device is not limited to a refrigerant such as cooling water, and may be another fluid.

The present disclosure is not limited to the embodiments described above, and various modifications are possible within the scope of the present disclosure without departing from the spirit of the disclosure.

What is claimed is:
1. A valve device comprising:
a housing having a communication passage forming a part of a path from an inlet to an outlet;
a valve body disposed to be rotatable about a predetermined axis in the housing, having a peripheral wall portion facing a communication passage port at one end of the communication passage, and adjusting an opening area of the communication passage port according to a rotation position thereof; and an actuator rotatably driving the valve body, wherein upon defining that a direction parallel to the axis is an axial direction,
a direction orthogonal to the axis is a radial direction,
a direction around the axis is a circumferential direction, and
a virtual line extending in the circumferential direction through a center of the communication passage port is a circumferential virtual line, the peripheral wall portion has a closure portion capable of fully closing the communication passage port, and a plurality of openings arranged apart from each other in the circumferential direction, the plurality of openings include a large opening and one or more small openings smaller than the large opening, the center of one or more small openings are axially offset with respect to the circumferential virtual line, the one or more small openings includes a plurality of small openings, the small openings are arranged on one side and on a different side of the circumferential virtual line; and the small openings each being axially offset from the circumferential virtual line, and configured to each be capable of independently opening the port, and the large opening, being located on the circumferential virtual line, is configured to be capable of independently opening substantially all of the port.

2. The valve device of claim 1, wherein
a relative movement area of the communication passage port in the circumferential direction, which is allowed while maintaining a fully closed state of the communication passage port, is a first allowable movement area,
at least a part of a circumferential range of a predetermined small opening overlaps with another circumferential range of the first allowable movement area.

3. The valve device of claim 1, wherein
a state in which the small openings independently opens the communication passage port as a single opening state, and
a relative movement area of the communication passage port in the circumferential direction which is allowed while maintaining the single opening state is a second allowable movement area of the two small openings adjacent to each other in the circumferential direction, at least a part of the circumferential range of one of the small openings overlaps with the circumferential range of the second allowable movement area the other one of the small openings.

4. A valve device comprising:
a housing including:
(i) a communication passage,
(ii) a port associated with the communication passage, and
(iii) a passage center associated with the port; and
a valve body including:
(i) a rotating shaft portion including a valve axis,
(ii) a peripheral wall portion including an annular portion, and
(iii) a connecting portion connecting the rotating shaft portion to the peripheral wall portion, wherein the annular portion, includes:
(a) a circumferential virtual line extending through the passage center in a direction around the axis and orthogonal to the axis,
(b) a closure portion configured to be capable of closing the port, and intersecting the circumferential virtual line,
(c) a first small opening axially offset from the circumferential virtual line, and configured to be capable of independently opening to the port,
(d) a large opening configured to be capable of independently opening substantially all of the port, and
(e) a second small opening axially offset from the circumferential virtual line in a direction opposite to the axial offset of the first small opening, wherein the first small opening and the second small opening are respectively arranged on one side and on a different side of the circumferential virtual line.

5. The valve device of claim 4, wherein the annular portion is configured such that, in a first rotation position:
(i) the first small opening is in sole communication with the port, and
(ii) a first circumferential range of a first movable area of the port overlaps the second small opening circumferentially.

6. The valve device of claim 4, wherein the annular portion is configured such that, in a first rotation position:
(i) the closure portion fully closes the port, and
(ii) a closed circumferential range of a closure-keeping movement area of the port overlaps the first small opening circumferentially.

7. A valve device comprising:
a housing having a communication passage forming a part of a path from an inlet to an outlet;
a valve body disposed to be rotatable about a predetermined axis in the housing, having a peripheral wall portion facing a communication passage port at one end of the communication passage, and adjusting an opening area of the communication passage port according to a rotation position thereof; and
an actuator rotatably driving the valve body, wherein upon defining that
a direction parallel to the axis is an axial direction,
a direction orthogonal to the axis is a radial direction,
a direction around the axis and orthogonal to the axis is a circumferential direction, and
a virtual line extending in the circumferential direction and intersecting a center of the communication passage port is a circumferential virtual line, the peripheral wall portion has a closure portion capable of fully closing the communication passage port, and a plurality of openings arranged apart from each other in the circumferential direction, the plurality of openings include a large opening and one or more small openings smaller than the large opening, the center of one or more small openings are axially offset with respect to the circumferential virtual line, a relative movement area of the communication passage port in the circumferential direction, which is allowed while maintaining a fully closed state of the communication passage port, is a first allowable movement area, at least a part of a circumferential range of one of the one or more of the small openings overlaps with another circumferential range of the first allowable movement area; and the small openings being configured to each be capable of independently opening the port, and the large opening, being located on the circumferential virtual line, is configured to be capable of independently opening substantially all of the port.

* * * * *